US009054787B2

(12) United States Patent
Vazquez et al.

(10) Patent No.: US 9,054,787 B2
(45) Date of Patent: Jun. 9, 2015

(54) METHOD AND APPARATUS FOR ALIGNMENT IN NEIGHBORING NETWORKS

(75) Inventors: Marcos Martinez Vazquez, Barcelona (ES); Agustin Badenes Corella, Valencia (ES)

(73) Assignee: MARVELL WORLD TRADE LTD., St. Michael (BB)

( * ) Notice: Subject to any disclaimer, the term of this patent is extended or adjusted under 35 U.S.C. 154(b) by 809 days.

(21) Appl. No.: 13/313,502

(22) Filed: Dec. 7, 2011

(65) Prior Publication Data

US 2012/0147934 A1 Jun. 14, 2012

Related U.S. Application Data (60) Provisional application No. 61/421,961, filed on Dec. 10, 2010.

(51) Int. Cl.
*H04B 3/54* (2006.01)

(52) U.S. Cl.
CPC ........ *H04B 3/542* (2013.01); *H04B 2203/5416* (2013.01); *H04B 2203/542* (2013.01); *H04B 2203/5445* (2013.01)

(58) Field of Classification Search
CPC ...................................... H04B 3/542
USPC .......................................... 307/3
See application file for complete search history.

(56) References Cited

U.S. PATENT DOCUMENTS

| 8,295,390 | B2 * | 10/2012 | Koga et al. ...................... 375/295 |
| 8,374,256 | B2 * | 2/2013 | Kodama et al. ................ 375/259 |
| 2003/0186694 | A1 * | 10/2003 | Sayers et al. ................ 455/426.1 |
| 2007/0097960 | A1 | 5/2007 | Kurobe et al. |
| 2007/0160172 | A1 * | 7/2007 | Koga et al. ...................... 375/354 |
| 2008/0062891 | A1 * | 3/2008 | Van der Merwe et al. ..... 370/254 |
| 2009/0238288 | A1 * | 9/2009 | Kodama et al. ................ 375/259 |
| 2009/0252118 | A1 * | 10/2009 | Nasielski et al. ............. 370/331 |
| 2010/0104030 | A1 * | 4/2010 | Koga et al. ...................... 375/257 |

FOREIGN PATENT DOCUMENTS

| WO | WO 2006/073138 A1 | 7/2006 |
| WO | WO 2007/004742 A1 | 1/2007 |

OTHER PUBLICATIONS

Notification of Transmittal of the International Search Report and the Written Opinion of the International Searching Authority, or the Declaration, mailed May 29, 2012 in counterpart International Application No. PCT/IB2011/003288.

* cited by examiner

*Primary Examiner* — Daniel Cavallari (57) ABSTRACT

A method includes detecting, at a first timing with reference to a periodic signal that is common to a first domain and a second domain, a first signal indicative of the first domain. The first signal is used by the first domain to signal presence of the first domain and a time used by the first domain for inter domain communication with other domains. Further, the method includes comparing, the first timing to a second timing with reference to the periodic signal. The second domain uses a second signal at the second timing to signal presence of the second domain and a time used by the second domain for inter domain communication with other domains. Then, the method includes aligning the first signal and the second signal to enable inter domain communication between the first domain and the second domain.

20 Claims, 6 Drawing Sheets

METHOD AND APPARATUS FOR ALIGNMENT IN NEIGHBORING NETWORKS

INCORPORATION BY REFERENCE

This present disclosure claims the benefit of U.S. Provisional Application No. 61/421,961, filed on Dec. 10, 2010, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Neighboring networks may interfere with each other. In an example, a signal transmitted from a first node to a second node within a first network may be negatively affected when a third node in a second network transmits signals at the same time. To reduce the interference, in an example, the first network and the second network coordinate to avoid simultaneous transmissions by the first node and the third node.

SUMMARY

Aspects of the disclosure provide a method. The method includes detecting, at a first timing with reference to a periodic signal that is common to a first domain and a second domain, a first signal indicative of the first domain. The first signal is used by the first domain to signal presence of the first domain and a time used by the first domain for inter domain communication with other domains. Further, the method includes comparing, the first timing to a second timing with reference to the periodic signal. The second domain uses a second signal at the second timing to signal presence of the second domain and a time used by the second domain for inter domain communication with other domains. Then, the method includes aligning the first signal and the second signal to enable inter domain communication between the first domain and the second domain.

To detect the first signal, the method includes detecting the first signal indicative of the first domain with regard to an alternating current (AC) signal that is common to the first domain and the second domain. In an example, the method includes receiving an AC power supply and the first signal indicative of the first domain from a transmitting medium, such as a power line. In another example, the method includes receiving an AC power supply and the first signal indicative of the first domain from separate transmitting media, such as a power line and a phone line.

To detect the first signal, the method includes detecting the first signal at the first timing with reference to a zero crossing point of the AC signal.

To align the first signal and the second signal to enable inter domain communication between the first domain and the second domain, in an example, the method includes informing the first domain to change the first timing of the first signal. In another example, the method includes informing the second domain to change the second timing of the second signal.

Aspects of the disclosure provide an apparatus. The apparatus includes a modulation circuit configured to modulate a carrier signal to carry information to other apparatus, and a demodulation circuit configured to demodulate signals received from other apparatus. Further, the apparatus includes a controller coupled to the modulation circuit and the demodulation circuit. The controller is configured to detect, at a first timing with reference to a periodic signal that is common to a first domain and a second domain, a first signal indicative of the first domain. The first signal is used by the first domain to signal presence of the first domain and a time used by the first domain for inter domain communication with other domains. Further, the controller is configured to compare the first timing to a second timing with reference to the periodic signal. The apparatus belongs to the second domain and the second domain uses a second signal at the second timing to signal presence of the second domain and a time used by the second domain for inter domain communication with other domains. Further, the controller is configured to generate signals to at least one of the first domain and the second domain to align the first signal and the second signal to enable inter domain communication between the first domain and the second domain.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
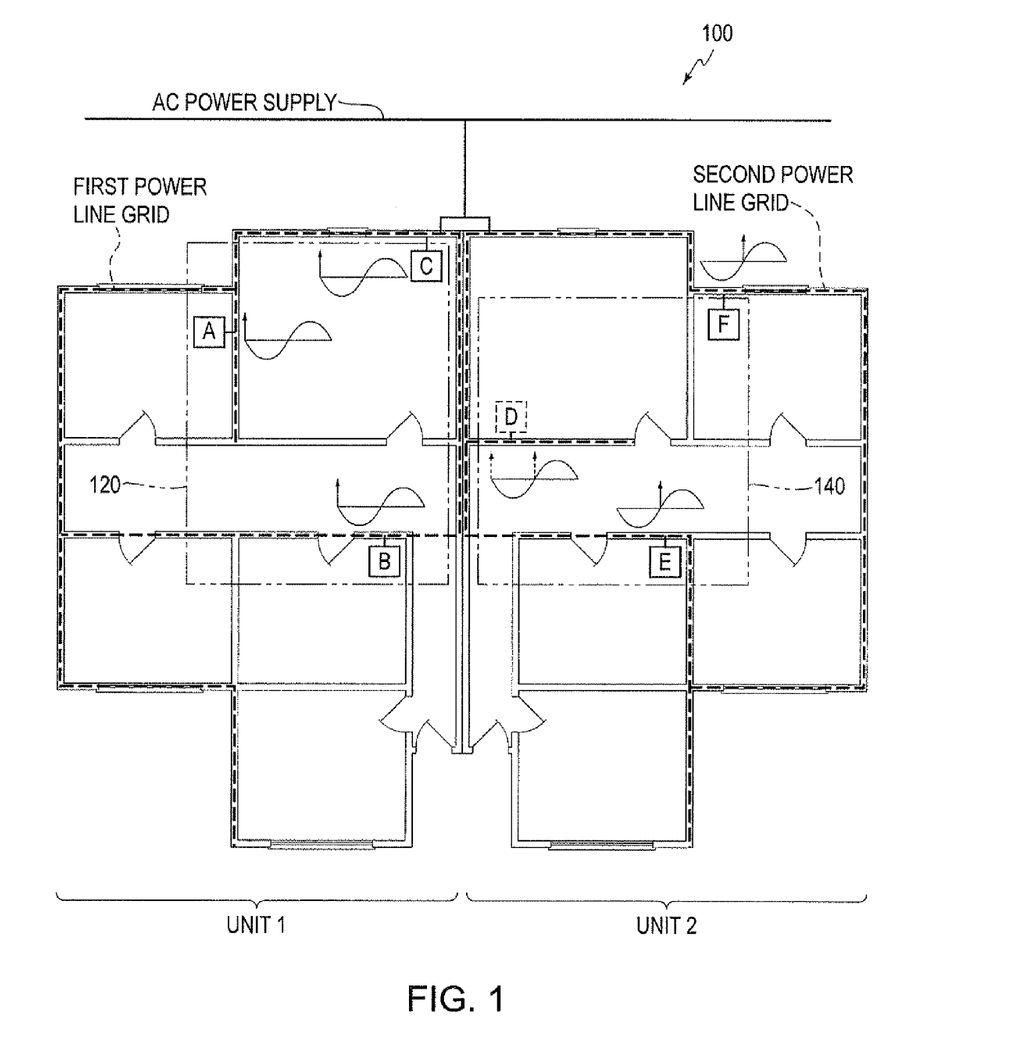
FIG. 1 shows a diagram of a first network domain 120 and a second network domain 140 according to an embodiment of the disclosure.

FIG. 1 shows a diagram of a first network domain 120 and a second network domain 140 according to an embodiment of the disclosure. In the FIG. 1 example, the first network domain 120 is a first home network, such as a home network configured according to a G.hn standard, located in building unit UNIT_1, and the second network domain 140 is a second home network, such as a home network configured according to a G.hn standard, located in building unit UNIT_2. The building UNIT_1 and the building UNIT_2 are adjoining building units. The first network domain 120 includes a first plurality of nodes, such as nodes A-C, configured to perform intra domain communication within the first network domain 120; and the second network domain 140 includes a second plurality of nodes, such as nodes D-F, configured to perform intra domain communication within the second network domain 140. In one embodiment, when the intra domain communication of one network interferes the intra domain communication of the other, the first network domain 120 and the second network domain 140 align a common communication channel to enable certain level of coordination between the first network domain 120 and second network domain 140 to reduce interferences.

According to an aspect of the disclosure, UNIT_1 includes a first wiring infrastructure, such as power line grid, phone lines, coaxial cable, and the like, that couples the first plurality of nodes to enable the intra domain communication in the first network domain 120, and UNIT_2 includes a second wiring infrastructure, such as power line grid, phone lines, coaxial cable, and the like, that couples the second plurality of nodes to enable the intra domain communication in the second network domain 140. When the first wiring infrastructure and the second wiring infrastructure are closely coupled, the intra domain communication of the first network domain 120 may interfere with the intra domain communication of the second network domain 140.

In an example, UNIT_1 includes a first power line grid of power supply wires that distributes electrical power to, for example, wall plugs in UNIT_1. Further, electrical appliances, such as desktop computer, television, set-top box, washing machine, rice cooker, modem, router, and the like, in UNIT_1 have respective power cables plugged into the wall plugs in UNIT_1, or plugged into any extension connector connected to the wall plug in UNIT_1. Similarly, UNIT_2 includes a second power line grid of power supply wires that distributes electrical power to wall plugs in UNIT_2. The electrical appliances in UNIT_2 have power cables plugged into the wall plugs in UNIT_2, or plugged into any extension connector connected to the wall plug in UNIT_2. In an example, the first power line grid and the second power line grid are at a same branch of a major power supply. For example, the first power line grid and the second power line grid are connected via a section of supply wires having a relatively short length, such as smaller than a pre-determined length (e.g., 5 feet or less). Thus, the first power line grid is closely coupled to the second power line grid.

In another example, the first power line grid includes a first power breaker panel that controls power from the major power supply to the first power line grid, and the second power line grid includes a second power breaker panel that controls power from the major power supply to the second power line grid. The first power line grid and the second power line grid are coupled by a plurality of electrical components, such as wires, the first power breaker panel, the second power breaker panel, and the like. However, the plurality of electrical components does not completely block high frequency signals, such as signals in the MHz frequency ranges, and the like, that can be used for communication.

In another example, the first network domain and the second network domain are within a same building unit, and the first plurality of nodes in the first network domain and the second plurality of nodes in the second network domain are connected to the same power line grid.

It is noted that, in an example, the electrical power is carried and distributed in the form of alternating current (AC) power. For example, each of the first and second power line grids carry and distribute a sinusoidal voltage signal having a predetermined frequency, such as 50 Hz, 60 Hz, and the like. In an example, an electrical appliance includes a power module configured to convert the sinusoidal voltage signal to an appropriate form to provide power to its internal circuits. According to an embodiment of the disclosure, the electrical appliance includes a timing circuit configured to detect timing information from the sinusoidal voltage signal. In an example, the timing circuit is configured to detect zero crossing points of the sinusoidal voltage signal.

Further, according to an embodiment of the disclosure, the first power line grid and the second power line grid are used to carry communication signals, such as orthogonal frequency division multiplexing (OFDM) signals, and the like, in the relatively high frequency ranges, such as in the MHz ranges. Then, multiple electrical appliances in UNIT_1 are configured to communicate via the first power line grid and form the first plurality of nodes in the first network domain 120, and multiple electrical appliances in UNIT_2 are configured to communicate via the second power line grid and form the second plurality of nodes in the second network domain 140.

In an example, an electrical appliance includes a modem configured to transmit the communication signals into the coupled power line grid and receive the communication signals from the coupled power line grid, and the electrical appliance forms a node of a network. Specifically, to transmit information to other nodes in the network, a modulation circuit of the modem modulates a carrier signal of a relatively high frequency to encode the information, and a coupling circuit of the modem, such as a transformer, and the like, injects the modulated carrier signal into the coupled power line grid to carry information to the other node. To receive information from other nodes, a high frequency filtering circuit of the modem extracts high frequency components from the coupled power line grid, and a demodulation circuit of the modem demodulates the high frequency components that were modulated by the other nodes to extract the encoded information. It is noted that the modem can include any other suitable modules. In an example, the modem includes a controller configured to prepare the information to the other nodes, and process the received information from the other nodes. Further, in an example, the controller also controls the operation of the electrical appliance. In an example, the controller is implemented as logic circuits; and in another example, the controller is implemented as a processor executing software instructions.

In another example, multiple electrical appliances in UNIT_1 are configured to communicate via another wiring infrastructure, for example, a coaxial cable wiring grid (not shown) in UNIT_1 and form the first plurality of nodes in the first network domain 120, and multiple electrical appliances in UNIT_2 are configured to communicate via a coaxial cable wiring grid (not shown) in UNIT_2 and form the second plurality of nodes in the second network domain 140. In the example, an electrical appliance includes a suitable modem configured to transmit the communication signals into the coupled coaxial cable and receives the communication signals from the coaxial cable, and the electrical appliance forms a node of a network.

It is noted that the information signals carried by the OFDM signals may attenuate over wire length. Thus, to ensure intra network communication over a relatively long wire length, the transmission power for the information signal is relatively large in an example. Then, the transmission may interfere with a neighboring network domain.

Further, one of the nodes in a network domain is a domain master configured to perform domain communication control. In an example, the node A in the first network domain 120 is a first domain master that performs domain communication control in the first network domain 120; and the node E in the second network domain 140 is a second domain master that performs domain communication control in the second network domain 140. It is noted that, in an example, any node in a network domain can be configured as a domain master of the network domain. Further, in an example, different nodes in the network domain can be dynamically configured to act the domain master for the network domain at different time.

It is noted that, in an example, the first network domain 120 and second network domain 140 are coupled to other networks, such as non-G.hn network, by other communication medium. In an example, the node A is a cable modem coupled to an Internet service provider. The Internet service provider suitably connects the node A to Internet.

Due to the reason that the first network domain 120 and the second network domain 140 use the same technique for intra domain communication, and the first power line grid and the second power line grid are closely coupled, the intra domain communication of the first network domain 120 and the intra domain communication of the second network domain 140 may interfere.

According to an embodiment of the disclosure, for intra network domain communication, the first network domain 120 and the second network domain 140 respectively allocate the communication medium, such as the first power line grid and the second power line grid, for communications based on media access control (MAC) cycle. In an example, each MAC cycle includes two AC cycles. For example, when the frequency of the AC power is 50 Hz, a MAC cycle is about 40 ms; and when the frequency of the AC power is 60 Hz, a MAC cycle is about 33 ms. A MAC cycle can be divided into time slots, and the domain master for each network domain allocates the time slots for communication. For example, the domain master can allocate certain time slot for a node in the network domain to use the communication medium to transmit information to other nodes. According to an embodiment of the disclosure, the domain master also allocates a time slot for inter domain communication. It is noted that the time slot for inter domain communication can be used for other purpose when inter domain communication is not needed, in an example.

In an example, when the interference between the first network domain 120 and the second network domain 140 is relatively low, such as lower than a threshold, that the first plurality of nodes in the first network 120 and the second plurality of nodes in the second network 140 are not aware of the other domain, the first domain master and the second domain master allocate the time slots independently. The time slot in the first network domain 120 allocated for inter domain communication and the time slot in the second network domain 140 allocated for inter domain communication may be misaligned.

According to an embodiment of the disclosure, when interference between the first network domain 120 and the second network domain 140 is relatively high, such as higher than a threshold, that at least one node in a domain is aware of the other domain, the first network domain 120 and the second network domain 140 align the time slots for inter domain communication to enable the first network domain 120 and the second network domain 140 to communicate. It is noted that, after the alignment, the first network domain 120 and the second network domain 140 can use any suitable protocol or technique, to use the aligned time slots for inter domain communication to communicate. For example, the first network domain 120 and the second network domain 140 use the aligned time slots to communicate level of interference. Based on the level of interference, the first network domain 120 and the second network domain 140 use the aligned time slots to communicate whether coordination is necessary. Further, when coordination is necessary, the first network domain 120 and the second network domain 140 can use the aligned time slots to communicate coordination techniques to reduce interference. It is noted that the first network domain 120 and the second network domain 140 can use any suitable coordinated communication techniques to reduce interference.

In an embodiment, the first network domain 120 and the second network domain 140 operate based on a common periodic signal. The first network domain 120 and the second network domain 140 align the respective time slots for the inter domain communication with regard to the common periodic signal.

In the FIG. 1 example, both the first network domain 120 and the second network domain 140 operate based on the sinusoidal signal on the power lines, and extract timing information from the sinusoidal signal. Thus, the first network domain 120 and the second network domain 140 align the time slots for the inter domain communication with regard to the sinusoidal signal. In an example, a plurality of sync points is defined with regard to the sinusoidal signal. According to an embodiment of the disclosure, sync points are zero crossing points of sinusoidal AC signals. The sinusoidal AC signals include sinusoidal signals of three phases that each one is phase shifted from the other two by 120°. Each sinusoidal signal includes two zero crossing points in an AC cycle. Thus, there are totally six sync points in an AC cycle for the sinusoidal AC signals, and the sync points are located at 0°, 60°, 120°, 180°, 240°, or 300° relative to a zero-crossing point of a sinusoidal signal.

According to an aspect of the disclosure, each network domain selects a sync point, such as one of the zero-crossing points in an AC cycle of the sinusoidal AC signal used in the network domain, and then nodes in the network domain emit a presence signal at a timing with reference to the selected sync point to signal domain presence. For example, each node in the first network domain 120 is configured to emit a first presence signal at a first timing with regard to a sync point selected for the first network domain 120 when the node is in a normal operation mode. The first presence signal is detectable by other network domains when the other network domains can receive the first presence signal. In an example, the first presence signal is generated using a common seed known to nodes of the other network domains. Thus, the first presence signal is indicative of presence of the first network domain 120 to the nodes of the other network domains. Further, the time slot allocated for the inter domain communication has a fixed offset with regard to the first presence signal. In an example, the first presence signal is a starting point of the time slot allocated for the inter domain communication in the first network domain 120.

Similarly, each node in the second network domain 140 is configured to emit a second presence signal at a second timing with regard to a sync point selected for the second network domain 140 when the node is in a normal operation mode. The second presence signal is detectable by other network domains when the other network domains can receive the second presence signal. In an example, the second presence signal is generated using the common seed. The second presence signal is indicative of presence of the second network domain 140 to nodes of the other network domains. Further, in an example, the second presence signal is a starting point of the time slot allocated for the inter domain communication in the second network domain 140.

Thus, in an example, the first network domain 120 and the second network domain 140 align the first presence signal and the second presence signal. Then, the respective time slots in the first network domain 120 and in the second network domain 140 allocated for inter domain communication are aligned and the aligned time slots can be used by the first network domain 120 and the second network domain 140 to perform inter domain communication.

In an example, an interference state changes when a new node joining a network domain. For example, initially, node D is off, the first plurality of nodes in the first network domain 120 and the second plurality of nodes in the second network domain 140 are not aware of the other network domain, and thus the first network domain 120 and the second network domain 140 do not interfere. The first network domain 120 and the second network domain 140 may operate independently without coordination. When node D starts to operate, the operation of node D may interfere the operation of nodes B and C in the first network domain 120, or the operation of nodes B and C may also interfere the operation of node D. In an embodiment, when a node starts to operate, the node starts an interference detection process before enters the normal operation mode. In the interference detection process, the node detects presence of other network domain. When the node is aware of other network domain, the node starts an alignment process to align time slots for inter domain communication.

According to an aspect of the disclosure, when node D starts to operate and has registered to the second network domain 140, node D enters an interference detection mode first. In the interference detection mode, in an example, the timing circuit of node D extracts the timing information from the received AC power supply, and the modem of node D monitors the power line grid based on the timing information to receive and detect presence signals of network domains. In an example, node D monitors the power line grid for a time period, such as an AC cycle, an MAC cycle, multiple MAC cycle, and the like, and receives and detects the presence signals. In another example, node D monitors the power line grid at timings with reference to all the sync points, such as the six zero crossing points. In another example, node D knows a timing of the domain presence signal of its own domain, and monitors the power line grid at timings with reference to other five zero crossing points. When node D detects the first presence signal, node D is aware of presence of other domain. Further, node D compares the timing of the first presence signal with the timing of the second presence signal of its own domain. When the timing of the first presence signal and the timing of the second presence signal are not aligned, node D detects misalignment of the time slots for inter domain communication. Then, node D starts the alignment process for inter domain communication. For example, node D suitably communicates with nodes in the first network domain 120 using the detected time slot allocated in the first network domain 120 for inter domain communication, and communicates with nodes in the second network domain 140 using any suitable time slot to align the time slots for inter domain communication together to enable coordination by the first network domain 120 and the second network domain 140.

According to another aspect of the disclosure, a node in a normal operation mode may enter an interference detection mode by itself or in response to a request from its domain master. In an example, each node includes a timer to trigger the node to enter the interference detection mode periodically. In another example, a node enters the interference detection mode when the node experiences significant performance degradation. In another example, a node enters the interference detection mode in response to a request from the domain master.

In an example, node D joins the second network domain 140 without awareness of other network domain. However, during operation, node D experiences performance degradation and enters the interference detection mode. In an example, node D monitors the power line grid for a time period, such as an AC cycle, an MAC cycle, multiple MAC cycle, and the like, and receives and detects the presence signals. In another example, node D monitors the power line grid at timings with reference to all the sync points, such as the six zero crossing points. In another example, node D knows a timing of the domain presence signal of its own domain, and monitors the power line grid at timings with reference to other five zero crossing points. When node D does not detect any presence signal other than the second presence signal of its own domain, node D is not aware of other network domain and determines that no interference is detected and goes back to the normal operation mode. It is noted that node D may inform the domain master E, and the domain master E may determine further actions in the second network domain 140. When node D detects the first presence signal, node D is aware of the other network domain. In an example, node D compares the timing of the first presence signal and the timing of the second presence signal of its own domain. When the two timings are not aligned, node D detects misalignment of the time slots for inter domain communication. Then, node D starts the alignment process for inter domain communication. For example, node D suitably communicates with nodes in the first network domain 120 using the detected time slots of the first network domain 120 for inter domain communication, and communicates with nodes in the second network domain 140 to align the time slots for inter domain communication together to enable coordination by the first network domain 120 and the second network domain 140.

Figure 2:
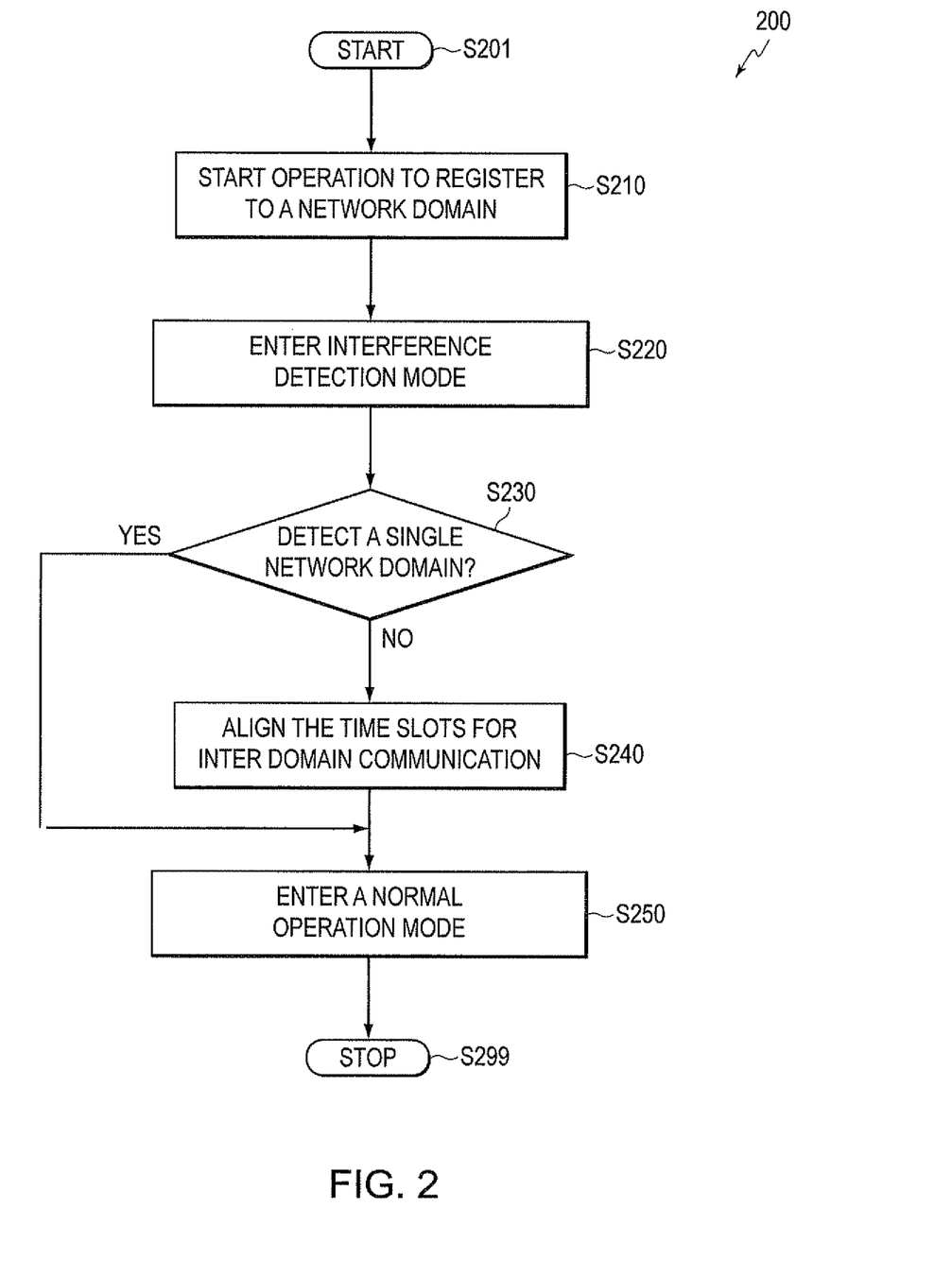
FIG. 2 shows a flow chart outlining a process example 200 according to an embodiment of the disclosure.

FIG. 2 shows a flow chart outlining a process example 200 in a cold detection scenario according to an embodiment of the disclosure. In the cold detection scenario, node D is initially switched off (e.g., the modem in node D is disabled). The process starts at S201 and proceeds to S210.

At S210, node D starts to operate. Node D follows any suitable protocol to detect and register to the second network domain 140.

At S220, node D enters an interference detection mode. In the interference detection mode, node D monitors and detects specific signals that indicate presence of network domains for a time period, such as an AC cycle, an MAC cycle, multiple MAC cycle, and the like. It is also noted that the specific signals are also indicative of timings for inter domain communication. For example, nodes in the first network domain 120 that operate in the normal operation mode emit the first presence signal at a first zero-crossing point to indicate the presence of the first network domain; and nodes in the second network domain 140 that operate in the normal operation mode emit the second presence signal at a second zero-crossing point that is different from the first zero-crossing point. The first presence signal is also indicative a start of a time slot allocated for inter domain communication in the first network domain 120; and the second presence signal is indicative a start of a time slot allocated for inter domain communication in the second network domain 140. In an example, node D detects the presence signals at six possible zero-crossing points of AC sinusoidal signals. In another example, node D knows the timing of the presence signal of its own domain, and detects the presence signals at five other zero-crossing points of AC sinusoidal signals.

At S230, node D determines whether a single network domain exists. For example, when node D detects no presence signal other than the second presence signal, node D determines that a single network domain exists, and the process proceeds to S250. However, when node D detects the first presence signal, node D is aware of presence of other network domain. Then, the process proceeds to S240.

At S240, node D communicates with nodes in the first network domain 120 and nodes in the second network domain 140 to align the time slots of the inter communication channel. In an example, node D sends a first message in the time slot for inter domain communication of the first network domain 120 into the first network domain 120, and sends a second message in a time slot assigned to node D for intra domain communication or in the time slot for inter domain communication of the second network domain 140 into the second network domain 140. The first message and the second message can include any suitable information to ask for alignment. In an example, each node includes a MAC address, each network domain includes a domain identification (ID), and a cluster ID that identifies a cluster of network domains that are aligned and are enabled to perform inter domain communication. Thus, the first message and the second message include MAC address, domain ID and cluster ID of node D, for example.

When a node in the first network domain 120, such as node C, receives the first message, the node responds with suitable information, such as MAC address, domain ID and cluster ID of the responding node, and the like, in a subsequent time slot for inter domain communication of the first network domain 120. When a node in the second network domain 140, such as node E and node F, receives the second message, the node responds with suitable information, such as MAC address, domain ID and cluster ID of the responding node, and the like, in a time slot allocated to the node for intra domain communication or in a subsequent time slot for inter domain communication of the second network domain 140.

Node D listens in the time slot for inter domain communication of the first network domain 120 and the time slot for intra domain communication in the second network domain 140 or the time slot for inter domain communication of the second network domain 140 to receive the responses from the first network domain 120 and the second network domain 140. Based on the responses, node D determines how to align the time slots for inter domain communication. In an example, node D determines to align the time slots to the lowest cluster ID in the reverse bit order. For example, when the first network domain 120 has the lowest cluster ID in the reversed bit order, node D informs node E (the domain master of the second network domain 140) of necessary information to change the timing of the second presence signal to align the second presence signal to the first presence signal. When the second network domain 140 has the lowest cluster ID in the reversed bit order, node D informs the responding node in the first network domain 120, such as node C, of necessary information to change the timing of the first presence signal to align the first presence signal to the second presence signal. Node C further informs other nodes, such as the domain master A, in the first network domain 120.

At S250, node D enters a normal operation mode. Because the first presence signal and the second presence signal are aligned and the time slot allocated in the first network domain 120 for inter domain communication, and the time slot allocated in the second network domain 140 for inter domain communication are aligned, the first network domain 120 and the second network domain 140 can use any suitable technique to coordinate and reduce interference. The process then proceeds to S299 and terminates.

It is noted that the process 200 can be suitable changed to a warm detection scenario when all nodes are initially in the normal operation mode. One or more nodes may enter the interference detection mode to detect presence of other home network domain and align the time slots for inter domain communication. For example, in a warm detection scenario, initially, nodes A-F are in the normal operation mode, and the first network domain 120 and the second network domain 140 are not aware of each other, and operate independently. However, after some time, the first network domain 120 and the second network domain 140 interfere, and node D starts to experience performance degradation. When node D has performance degradation, node D enters the interference detection mode, for example. Then, node D performs similar operations of S220-S250. As a result, the first network domain 120 and the second domain network 140 have aligned time slots to enable inter domain communication.

When two network domains align their time slots for inter domain communication, the two network domains form a cluster. Nodes in the cluster continue to signal their presence using domain specific signals that are now aligned, and may also send message including any suitable information, such as new node joined a domain, a node left a domain, and the like, in the now aligned time slots for inter domain communication. In addition, a node in the cluster may open detection window corresponding to the time slots for inter domain communication to listen to information, such as new node, a removed node, and the like, from the other domain. In an example, a node keeps a list of detected nodes from the other domain, and updates the list based on the information from the other domain.

FIGS. 3A-3D show signal plots in an interference detection and inter domain communication alignment process for the network domains shown in FIG. 1.

Figure 3A:
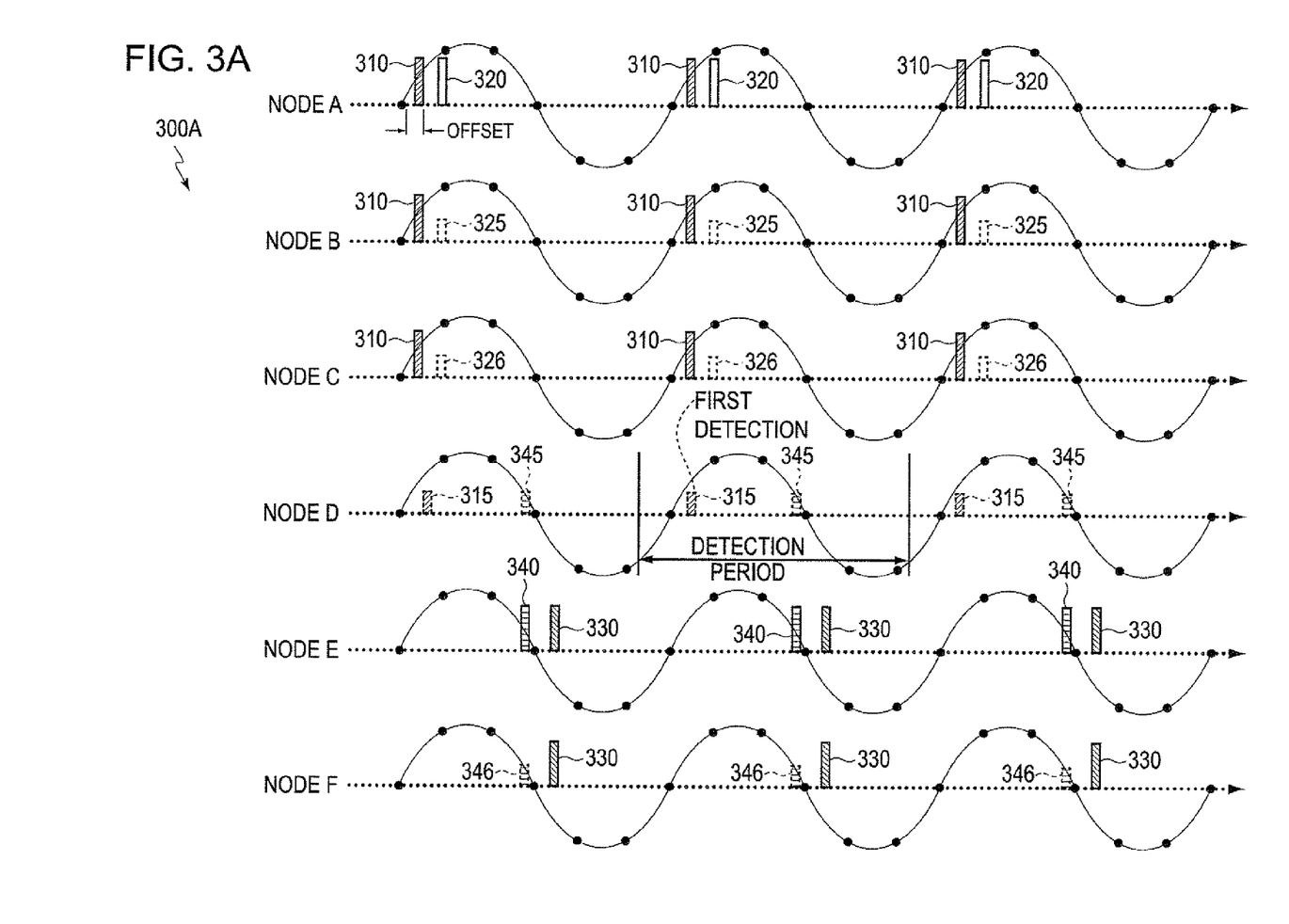
FIGS. 3A-3D show plots of signals during an interference detection and inter domain communication process according to an embodiment of the disclosure.

FIG. 3A shows a signal plot 300A when node D enters the interference detection mode. In an example, node D enters the interference detection mode in the cold detection scenario when node D starts to operate and has registered to the second network domain 140; and in another example, node D enters the interference detection mode in the warm detection scenario that node D is initially in the normal operation mode.

The first network domain 120 includes nodes A-C in the normal operation mode and node A is the domain master for the first network domain 120. The nodes A-C emit the first presence signal 310 with an offset to a first sync point. The domain master A emits a first media access plan (MAP) signal 320 that indicates time slot allocation in the first network domain 120 for next MAC cycle, for example. The node B receives the first MAP signal as shown by 325 and the node C receives the first MAP signal as shown by 326. It is noted that the timing of the first MAP signal 320 can be independent of the first presence signal 310.

The second network domain 140 includes nodes E and F in the normal operation mode and node D in the interference detection mode, and node E is the domain master for the second network domain 140. Nodes E and F emit the second presence signal 330 with the offset to a second sync point. The second sync point is different from the first sync point. The domain master E emits a second MAP signal 340 that indicates time slot allocation in the second network domain 140 for next MAC cycle, for example. Node F receives the second MAP signal as shown by 346. Node D monitors, for example, at five timings for domain presence signals other than the second network domain 140 in an AC cycle. Node D detects the first presence signal as shown by 315. It is noted that node D also detects the second MAP signal as shown by 345 to obtain the time slot allocation information in the second network domain 140. Then, node D is aware of other home network domain and starts a process to align the time slot for inter communication.

Figure 3B:
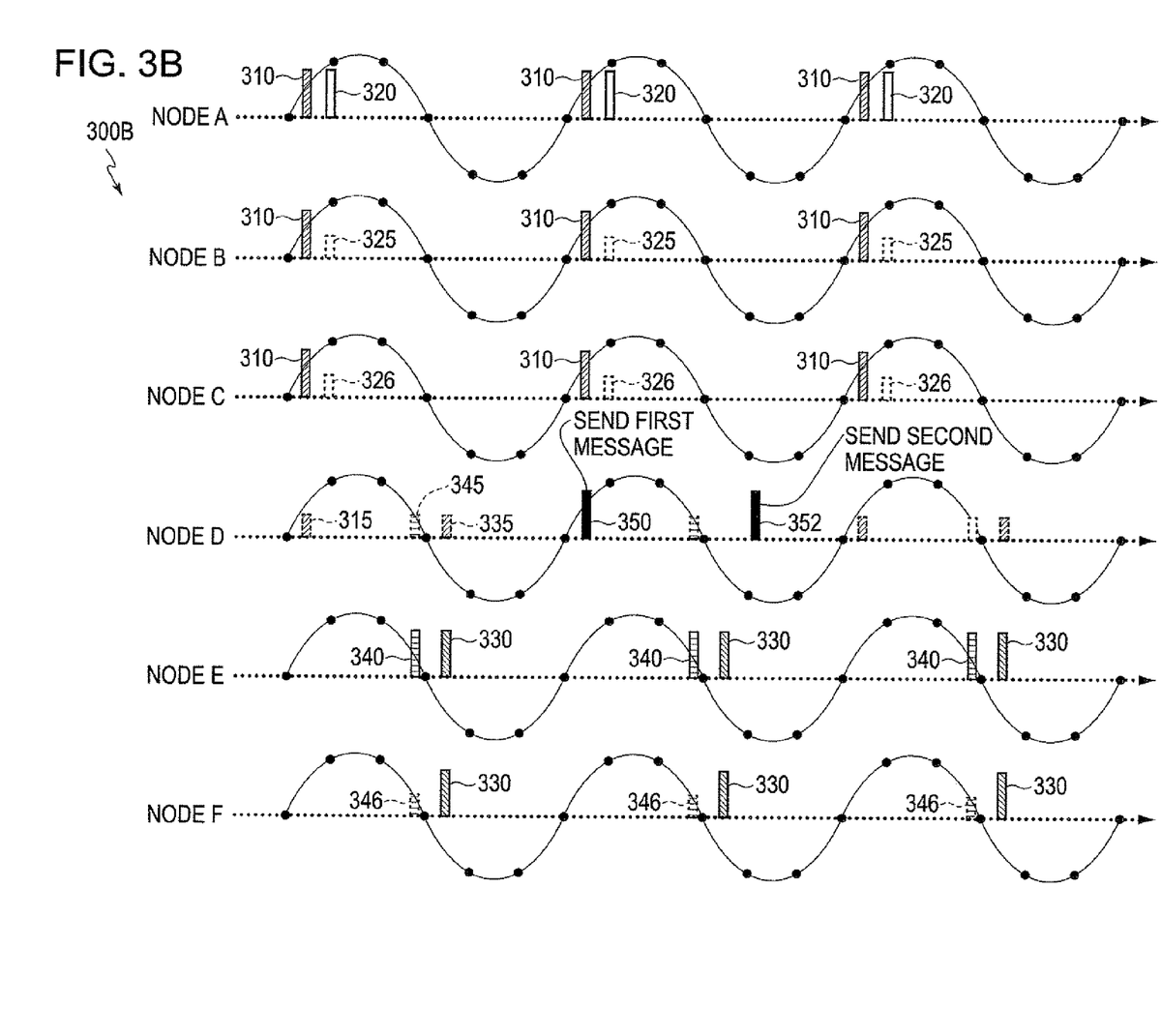

FIG. 3B shows a signal plot 300B when node D communicates to the first network domain 120 and the second network domain 140. Nodes A-C and nodes E and F work in the normal operation mode. Node D sends a first message to the first network domain 120 in the time slot for inter domain communication of the first network domain 120, as shown by 350. In addition, node D sends a second message to the second network domain 140. In an embodiment, node D sends the second message in a time slot allocated to node D for intra domain communication in the second network domain 140, as shown by 352. In another embodiment, node D sends the second message in the time slot of the second network 140 allocated for inter domain communication (not shown). One or more nodes, such as node C, in the first network domain 120 receive the first message, and send a responding message in the subsequent time slot for inter domain communication of the first network domain 120; and nodes in the second network domain 140 receive the second message and send a responding message in a suitable time slot.

Figure 3C:
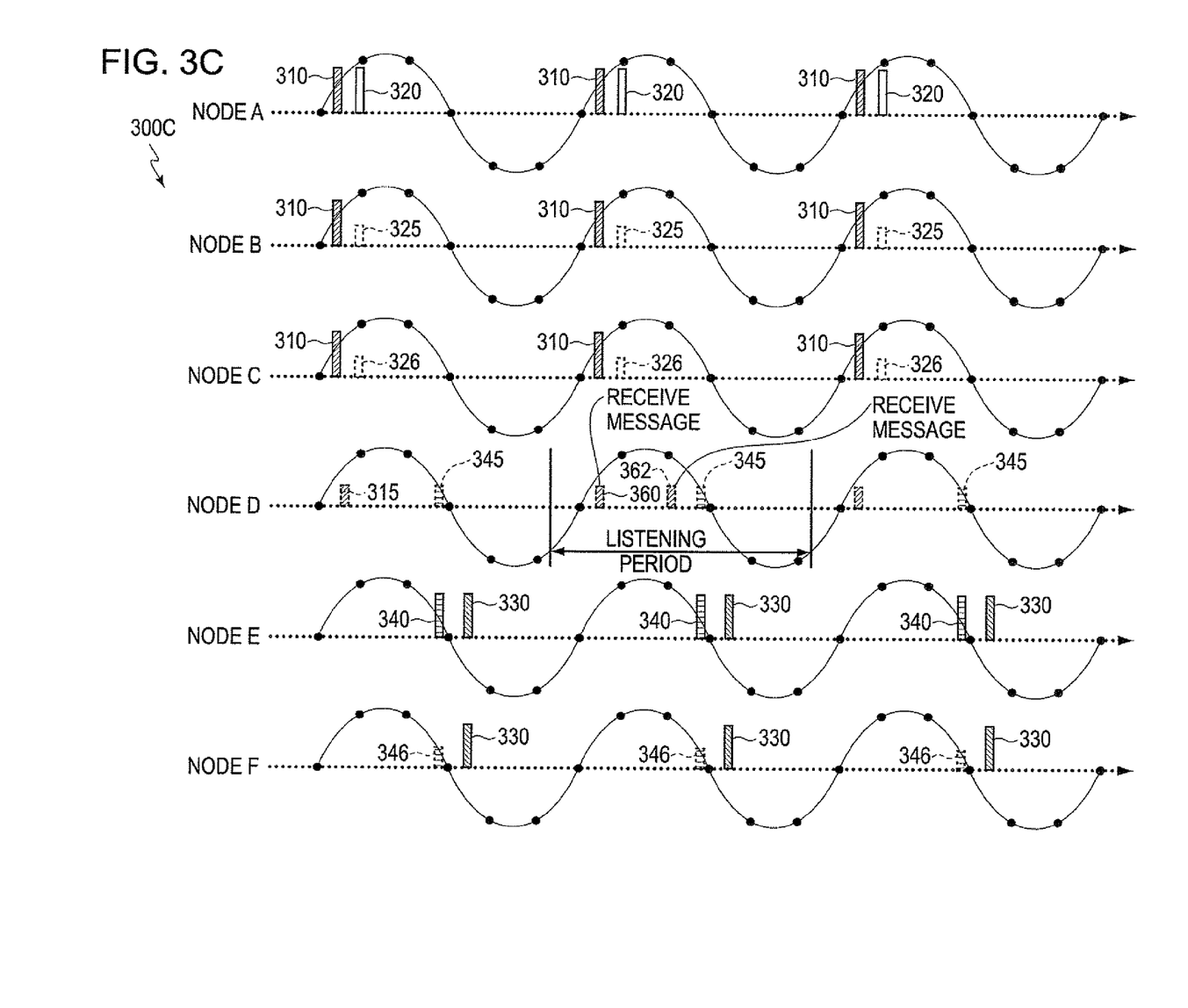

FIG. 3C shows a signal plot 300C when node D listens to the responding messages. Nodes A-C and nodes E and F work in the normal operation mode. Node D listens to responding messages from both the first network domain 120 and the second network domain 140. For example, node D receives a first responding message from the first network domain 120 in the time slot allocated for the inter domain communication of the first network domain 120, as shown by 360; and node D receives one or more second responding messages from the second network domain 140 in the time slot allocated for the intra domain communication of the second network domain 140, as shown by 362.

Based on the responding messages, node D decides how to synchronize the inter domain communication. In an example, node D informs its own domain master, such as node E, to change the timing of the second presence signal 330 to align the second presence signal 330 to the first presence signal 310. In another example, node D informs node C and node C informs the domain master A to change the timing of the first presence signal 310 to align the first presence signal 310 to the second presence signal 330.

Figure 3D:
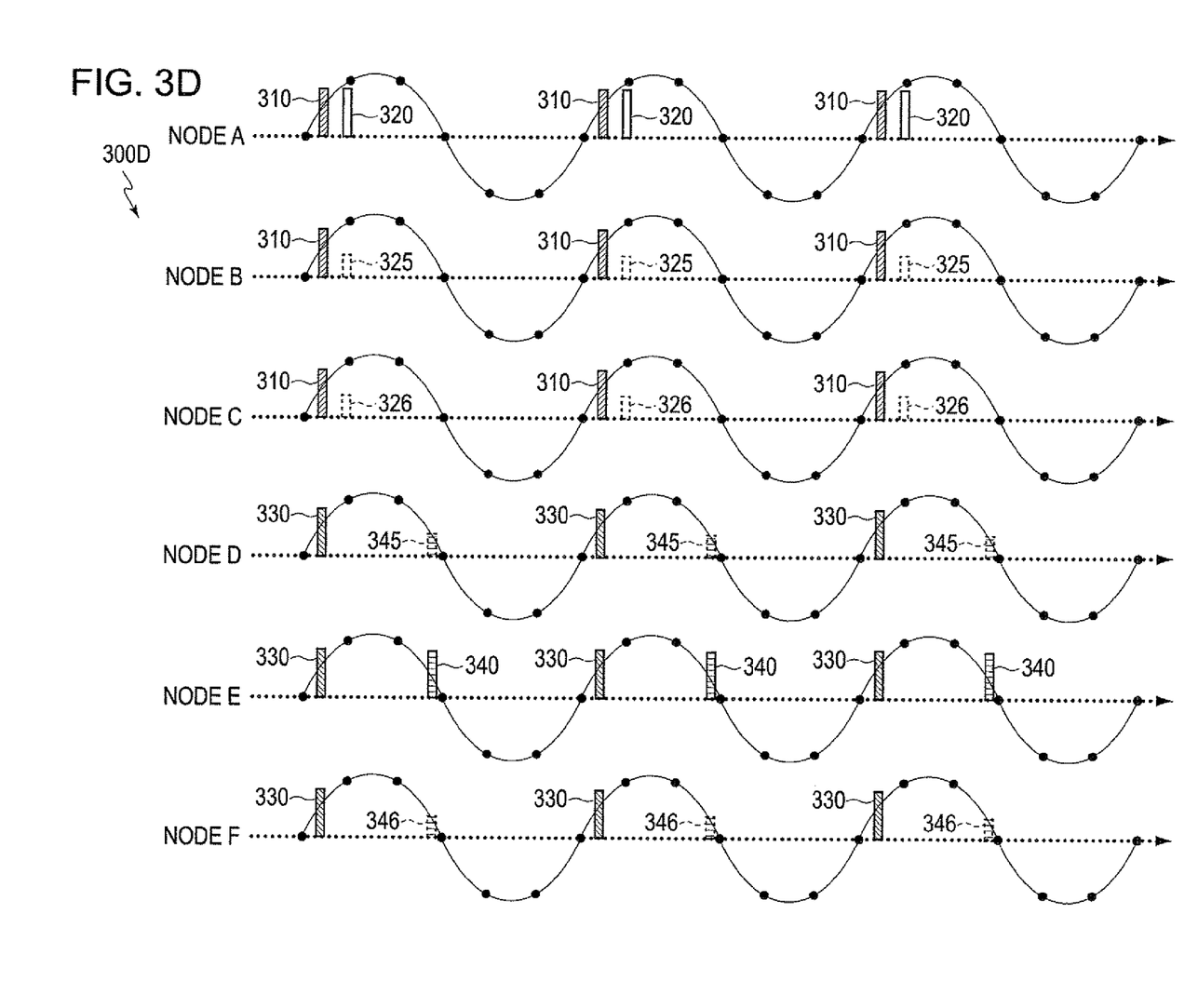

FIG. 3D shows a signal plot 300D when the timing of the second presence signal 330 has been changed to synchronize the time slots for the inter domain communication. All the nodes are in the normal operation mode. The time slots for inter domain communication are aligned to enable coordination between the first network domain 120 and the second network domain 140.

While aspects of the present disclosure have been described in conjunction with the specific embodiments thereof that are proposed as examples, alternatives, modifications, and variations to the examples may be made. For example, one or more steps of processes described above may be performed in a different order or concurrently and still achieve desirable results. Accordingly, embodiments as set forth herein are intended to be illustrative and not limiting. There are changes that may be made without departing from the scope of the claims set forth below.

What is claimed is:

1. A method, comprising:
   detecting, at a first timing with reference to a periodic signal that is common to a first domain and a second domain, a first signal indicative of the first domain, wherein the first signal is used by the first domain to signal presence of the first domain and a time used by the first domain for inter domain communication with other domains;
   comparing the first timing to a second timing with reference to the periodic signal, wherein the second domain uses a second signal at the second timing to signal presence of the second domain and a time used by the second domain for inter domain communication with other domains; and
   aligning the first signal and the second signal to enable inter domain communication between the first domain and the second domain.

2. The method of claim 1, wherein detecting the first signal indicative of the first domain comprises:
   detecting the first signal indicative of the first domain with regard to an alternating current (AC) signal that is common to the first domain and the second domain.

3. The method of claim 2, further comprising at least one of:
   receiving an AC power supply and the first signal indicative of the first domain from a transmitting medium; and
   receiving an AC power supply and the first signal indicative of the first domain from separate transmitting media.

4. The method of claim 2, wherein detecting the first signal indicative of the first domain further comprises:
   detecting the first signal at the first timing with reference to a zero crossing point of the AC signal.

5. The method of claim 1, wherein aligning the first signal and the second signal to enable inter domain communication between the first domain and the second domain further comprises at least one of:
   informing the first domain to change the first timing of the first signal; or
   informing the second domain to change the second timing of the second signal.

6. The method of claim 1, wherein aligning the first signal and the second signal to the same timing to enable inter domain communication between the first domain and the second domain further comprises:
   informing the first domain based on the detected first signal at the first timing; and
   informing the second domain based on at least one of the second signal having the second timing and intra domain communication.

7. The method of claim 6, further comprising:
   receiving information from the first domain based on the detected first signal; and
   receiving information from the second domain based on at least one of the second signal having the second timing, and intra domain communication.

8. The method of claim 7, further comprising:
   determining a timing change for at least one of the first signal and the second signal based on the received information from the first domain and the second domain.

9. The method of claim 1, further comprising:
   entering an interference detection mode when an apparatus joins the second domain.

10. The method of claim 9, further comprising at least one of:
    entering the interference detection mode periodically;
    entering the interference detection mode in response to a request from a domain master of the second domain; or
    entering the interference detection mode in response to a performance degradation.

11. An apparatus, comprising:
    a modulation circuit configured to modulate a carrier signal to carry information to other apparatus;
    a demodulation circuit configured to demodulate signals received from other apparatus; and
    a controller coupled to the modulation circuit and the demodulation circuit and configured to
      detect, at a first timing with reference to a periodic signal that is common to a first domain and a second domain, a first signal indicative of the first domain, wherein the first signal is used by the first domain to signal presence of the first domain and a time used by the first domain for inter domain communication with other domains,
      compare the first timing to a second timing with reference to the periodic signal, wherein the second domain that the apparatus belongs to uses a second signal at the second timing to signal presence of the second domain and a time used by the second domain for inter domain communication with other domains, generate signals to at least one of the first domain and the second domain to align the first signal and the second signal to enable inter domain communication between the first domain and the second domain.

12. The apparatus of claim 11, wherein the periodic signal comprises a sinusoidal signal.

13. The apparatus of claim 12, wherein the sinusoidal signal comprises an alternating current (AC) voltage signal.

14. The apparatus of claim 13, wherein the controller is configured to detect the first signal with a predetermined offset to a zero crossing point of the AC voltage signal.

15. The apparatus of claim 11, wherein the controller is configured to i) generate the signals to inform the first domain to change the first timing of the first signal, or ii) generate the signals to inform the second domain to change the second timing of the second signal.

16. The apparatus of claim 11, wherein the controller is configured to generate the signals to inform interference to the first domain based on the detected first signal.

17. The apparatus of claim 16, wherein the controller is configured to receive information from the first domain based on the detected first signal.

18. The apparatus of claim 17, wherein the controller is configured to determine a timing change for at least one of the first signal and the second signal based on the received information from the first domain and the second domain.

19. The apparatus of claim 11, wherein the controller is configured to control the apparatus to enter an interference detection mode to detect the first signal.

20. The apparatus of claim 19, wherein the controller is further configured to control the apparatus to:
- enter the interference detection mode periodically;
- enter the interference detection mode in response to a request from a domain master; or
- enter the interference detection mode in response to a performance degradation.

* * * * *